(12) United States Patent
Milbaier

(10) Patent No.: US 11,459,023 B2
(45) Date of Patent: Oct. 4, 2022

(54) METHOD FOR CONTROLLING A STEERING SYSTEM HAVING ELECTRIC STEERING ASSISTANCE

(71) Applicant: Robert Bosch GmbH, Stuttgart (DE)

(72) Inventor: Paul Milbaier, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 16/640,984

(22) PCT Filed: Aug. 8, 2018

(86) PCT No.: PCT/EP2018/071458
§ 371 (c)(1),
(2) Date: Feb. 21, 2020

(87) PCT Pub. No.: WO2019/063176
PCT Pub. Date: Apr. 4, 2019

(65) Prior Publication Data
US 2020/0198693 A1 Jun. 25, 2020

(30) Foreign Application Priority Data
Sep. 26, 2017 (DE) ...................... 10 2017 217 084.0

(51) Int. Cl.
*B62D 5/04* (2006.01)
*B62D 1/20* (2006.01)
(Continued)

(52) U.S. Cl.
CPC ............. *B62D 5/0463* (2013.01); *B62D 1/20* (2013.01); *B62D 15/0215* (2013.01); *H02P 23/0022* (2013.01)

(58) Field of Classification Search
CPC ..... B62D 5/0463; B62D 1/20; B62D 15/0215
See application file for complete search history.

(56) References Cited

U.S. PATENT DOCUMENTS 10,059,368 B2 * 8/2018 Sakaguchi ........... B62D 5/0463
10,124,826 B2 * 11/2018 She ...................... B62D 5/0448
(Continued)

FOREIGN PATENT DOCUMENTS

CN          101678856 A     3/2010
CN          101863283 A     10/2010
(Continued)

OTHER PUBLICATIONS

International Search Report corresponding to PCT Application No. PCT/EP2018/071458, dated Dec. 13, 2018 (German and English language document) (6 pages).

*Primary Examiner* — Tony H Winner
*Assistant Examiner* — Michael R Stabley
(74) *Attorney, Agent, or Firm* — Maginot, Moore & Beck LLP

(57) ABSTRACT

The disclosure relates to a method and to a device for controlling a steering system and to a steering system having electric steering assistance, wherein a reference variable for the steering assistance is predefined by a steering controller, the steering system is controlled as a function of the reference variable, a compensation value to compensate for a dynamic behavior of an axle steered by the steering system is determined on the basis of a model, the reference variable is determined as a function of the compensation value. The disclosure further relates to a method and to a device for emulating dynamics of the steered axle.

12 Claims, 2 Drawing Sheets

(51) Int. Cl.
*B62D 15/02* (2006.01)
*H02P 23/00* (2016.01)

(56) References Cited

U.S. PATENT DOCUMENTS

| | | | |
|---|---|---|---|
| 2004/0055810 A1* | 3/2004 | Chabaan | B62D 6/10 |
| | | | 180/446 |
| 2006/0060412 A1 | 3/2006 | Bolourchi et al. | |
| 2013/0311044 A1 | 11/2013 | Tamaizumi et al. | |
| 2014/0008141 A1 | 1/2014 | Kageyama et al. | |
| 2017/0158228 A1* | 6/2017 | She | B62D 5/0463 |
| 2017/0183031 A1 | 6/2017 | Ko | |
| 2017/0297613 A1* | 10/2017 | Sakaguchi | G05B 13/041 |

FOREIGN PATENT DOCUMENTS

| | | |
|---|---|---|
| CN | 102837736 A | 12/2012 |
| CN | 104520167 A | 4/2015 |
| DE | 102 35 039 A1 | 2/2004 |
| DE | 10 2009 002 245 A1 | 10/2010 |
| EP | 1 304 275 A1 | 4/2003 |
| EP | 1 554 169 B1 | 9/2008 |
| EP | 2 735 495 A2 | 5/2014 |
| EP | 3 196 098 A1 | 7/2017 |
| JP | H08-244635 A | 9/1996 |
| JP | H11-49000 A | 2/1999 |
| JP | 2006-213174 A | 8/2006 |
| JP | 2008-222115 A | 9/2008 |
| JP | 2012-240456 A | 12/2012 |
| JP | 2017-165266 A | 9/2017 |
| JP | 2017-165306 A | 9/2017 |
| WO | 2016/007705 A1 | 1/2016 |

\* cited by examiner

METHOD FOR CONTROLLING A STEERING SYSTEM HAVING ELECTRIC STEERING ASSISTANCE

This application is a 35 U.S.C. § 371 National Stage Application of PCT/EP2018/071458, filed on Aug. 8, 2018, which claims the benefit of priority to Serial No. DE 10 2017 217 084.0, filed on Sep. 26, 2017 in Germany, the disclosures of which are incorporated herein by reference in their entirety.

The disclosure relates to a method for controlling a steering system having electric steering assistance and a steering system.

Electric steering assistance provided by a steering controller is used to introduce a target assistance torque into a steering gear of a steering system. Such electric steering assistance is well known.

However, the dynamic behavior of the axle, also known as front axle dynamics, is not taken into account in current steering systems with electric steering assistance. In the case of a steering gear with a toothed rack, the front axle dynamics are a force response of the front axle to a rack shift. Depending on the vehicle, the front axle dynamics can lead to instability or loss of steering feel.

The steering controller must therefore be parameterized in such a way that it is stable with the front axle dynamics assumed to be unknown.

The object of the disclosure is to provide improved steering control.

This is achieved by the control method and the steering system according to the disclosure.

With regard to the method for controlling a steering system with electric steering assistance, it is provided that a setpoint variable for the steering assistance is specified by a steering controller, the steering system is controlled depending on the setpoint variable, a compensation value to compensate the dynamic behavior of an axle steered by the steering system is determined based on a model, and the setpoint variable is determined depending on the compensation value. As a result, active model-based compensation of the front axle dynamics is achieved that improves control. In addition, more cost-intensive solutions are avoided, for example stiffer connection of a ball screw drive of the front axle in order to achieve a more robust control system.

Advantageously, the compensation value characterizes a rack force that acts on a rack of the steering system. This compensates for the rack force that causes the rack to deflect. This influence on the setpoint variable allows a particularly fast reaction of the control to disturbances.

Advantageously, the compensation value is determined depending on information about rack travel, which indicates a deflection of the rack of the steering system relative to a reference position of the rack. Direct recording of the disruption of front axle dynamics on the rack allows the use of a linear model based on conventional sensors.

Advantageously, the information about the rack travel is determined depending on at least one measured value, wherein the measured value characterizes information about a rotor position of an electric drive of the steering assistance relative to a reference position, or wherein the measured value characterizes information about a torque on a torsion bar, wherein the torsion bar connects a steering wheel of the steering system to the electric drive of the electric steering system, or where the measured value characterizes information about an angular position of a steering wheel or information about an angular position of a shaft driving the rack relative to a reference angle position. This makes it possible to easily record the measured values by means of angular position encoders or torque encoders. Sensor fusion by means of a Kalman filter can be provided.

Advantageously, the compensation value is determined as $$\tilde{G}=1-cLR,$$

with $c \in \mathbb{R}$

L Transmission behavior from the motor torque of the electric drive of the steering assistance to the torque ($T_{Tb}$) on the torsion bar, R Transmission behavior from the rack travel ($s_{Ra}$) to the rack force ($F_{Ra}$).

This enables the influence of the front axle to be eliminated by a pilot controller.

Advantageously, a setpoint motor torque is determined, wherein a compensated setpoint motor torque is determined as the setpoint variable depending on the compensation value and the setpoint motor torque. This enables simple integration into conventional controls by means of setpoint assistance torques.

With regard to the steering system, it is provided that the steering controller is designed to specify the setpoint variable for the steering assistance, wherein the steering system is controlled depending on the setpoint variable, the steering controller is designed to determine a compensation value for compensating the dynamic behavior of an axle steered by the steering system based on a model, wherein the setpoint variable is determined depending on the compensation value. The compensation of dynamic behavior by the steering controller improves the control.

Advantageously, the steering system comprises a rack, wherein the compensation value characterizes a rack force that acts on the rack. This influence on the control of the rack allows a particularly good influence on the dynamics.

Advantageously, the steering controller is designed to determine the compensation value depending on information about rack travel, which indicates a deflection of the rack of the steering system relative to a reference position of the rack. This makes it particularly easy to take the dynamics into account.

Advantageously, the steering controller is designed to determine the information about the rack travel depending on at least one measured value, wherein the steering system comprises an angular position encoder that is designed to determine the measured value as information about a rotor position of an electric drive of the steering assistance relative to a reference position, or wherein the steering system comprises a torque encoder that is designed to provide information about a torque on a torsion bar, wherein the torsion bar connects a steering wheel of the steering system to the electric drive of the electric steering system, or wherein the steering system comprises an angular position encoder that is embodied to detect information about an angular position of the steering wheel relative to a reference angle position, or wherein the steering system includes an angular position encoder designed to detect information about an angular position of a shaft driving the rack relative to a reference angle position. The measurement value detection by means of angular position encoders or torque encoders is particularly well represented in conventional steering systems.

Advantageously, the steering controller is designed to determine the compensation value as $$\tilde{G}=1-cLR,$$

With $C \in \mathbb{R}$,

L Transmission behavior from the motor torque of the electric drive of the steering assistance to the torque ($T_{Tb}$) on the torsion bar, R Transmission behavior from the rack travel ($s_{Ra}$) to the rack force ($F_{Ra}$)

This allows simple integration as a pilot controller in conventional control systems.

Advantageously, the steering controller is designed to determine a setpoint motor torque, wherein a compensated setpoint motor torque is determined as the setpoint variable depending on the compensation value and the setpoint motor torque. This control is particularly easy to integrate into traditional controls.

According to another aspect of the disclosure, which can be realized in particular on its own or advantageously in addition to the aforementioned aspects of the disclosure, a method is proposed for emulation of the dynamics of an axle of a motor vehicle steered by a steering system, wherein the steering system comprises a rack, wherein a compensation value to compensate for dynamic behavior of the axle steered by the steering system is determined based on a model. In addition, the compensation value is advantageously determined depending on information about rack travel, which indicates in particular a deflection of the rack of the steering system relative to a reference position of the rack. The information about the rack travel is advantageously determined depending on at least one measured value, wherein the measured value preferably characterizes information about a rotor position of an electric drive of the steering assistance relative to a reference position, or wherein the measured value characterizes information about an angular position of a steering wheel or information about an angular position of a shaft driving the rack relative to a reference angle position. In particular, this enables the already mentioned advantages to be achieved. In particular, as a result active, model-based compensation of the front axle dynamics is carried out, which improves the control. Furthermore, more expensive solutions are avoided, for example stiffer connection of a ball screw drive of the front axle in order to achieve a more robust control system.

According to a further aspect of the disclosure, which can be realized in particular on its own or advantageously in addition to the aforementioned aspects of the disclosure, a device for the emulation of the dynamics of an axle steered by a steering system of a motor vehicle is proposed, wherein the steering system comprises a rack, wherein the device is designed to determine a compensation value to compensate for the dynamic behavior of the axle steered by the steering system based on a model. In addition, the compensation value is advantageously determined depending on information about rack travel, which in particular characterizes a deflection of the rack of the steering system relative to a reference position of the rack. The information about the rack travel is advantageously determined depending on at least one measured value, wherein the measured value preferably characterizes information about a rotor position of an electric drive of the steering assistance relative to a reference position, or wherein the measured value characterizes information about an angular position of a steering wheel or information about an angular position of a shaft driving the rack relative to a reference angle position. In particular, this will allow the aforementioned advantages to be achieved. In particular, as a result active, model-based compensation of the front axle dynamics is carried out, which improves the control. In addition, more expensive solutions are avoided, for example stiffer connection of a ball screw drive of the front axle to achieve a more robust control system.

BRIEF DESCRIPTION OF THE DRAWINGS

Other advantageous embodiments result from the following description and the drawing. In the figures.

DETAILED DESCRIPTION

Figure 1:
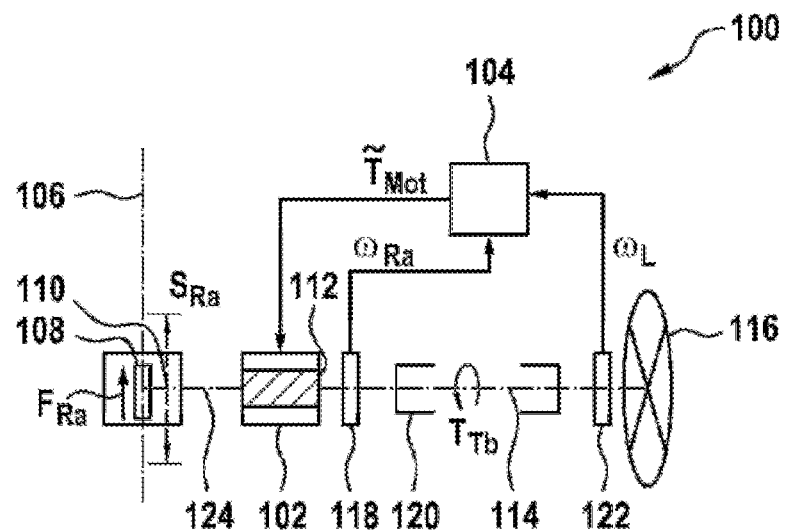
FIG. 1 shows a steering system schematically.

FIG. 1 shows schematically a steering system 100 having electric steering assistance 102.

A steering controller 104 is designed to specify a setpoint variable $\tilde{T}_{Mot}$ for the steering assistance 102. The steering system 100 is controlled depending on the setpoint variable $\tilde{T}_{Mot}$. The steering system 100 comprises an axle 106, which is movable by a rack 108. In the example, the setpoint variable is a setpoint torque for the steering assistance 102. Due to the front axle dynamics there is a rack force $F_{Ra}$ that acts on the rack 108. The rack 108 is moved through a rack travel $s_{Ra}$, which indicates a deflection of the rack 108 of the steering system 100 relative to a reference position 110 of the rack 108. In the example, a positive rack force $F_{Ra}$ acts in the direction of the arrow in FIG. 1, in the direction of a deflection of the rack 108 with a positive rack travel $s_{Ra}$. In the example a negative rack force $F_{Ra}$ acts against the direction of the arrow, in the direction of a deflection of the rack 108 with a negative rack travel $s_{Ra}$. This definition is by way of example and can be chosen differently.

The steering controller 104 is designed to determine information about the rack travel $s_{Ra}$ depending on at least one measured value. The steering system 100 comprises, for example, an angular position encoder 118, which is designed to record the measured value as information about a rotor position 202 of an electric drive 112 of the steering assistance 102 relative to a reference position 204.

The steering system 100 in the example comprises a torque encoder 116, which is designed to detect information about a torque $T_{Tb}$ on a torsion bar 114, wherein the torsion bar 114 connects a steering wheel 116 of the steering system 100 to the electric drive 112 of the electric steering system 100.

The steering system 100 may also additionally or alternatively include an angular position encoder 122, which is designed to capture information about an angular position $\omega_L$ of the steering wheel 116 relative to a reference angle position $\omega_{Ref}$. It may also be provided that the angular position encoder 118 is embodied to detect information about an angular position $\omega_{Ra}$ of a shaft 124 that drives the rack relative to a reference angle position $\omega_{Ref}$.

Figure 2:
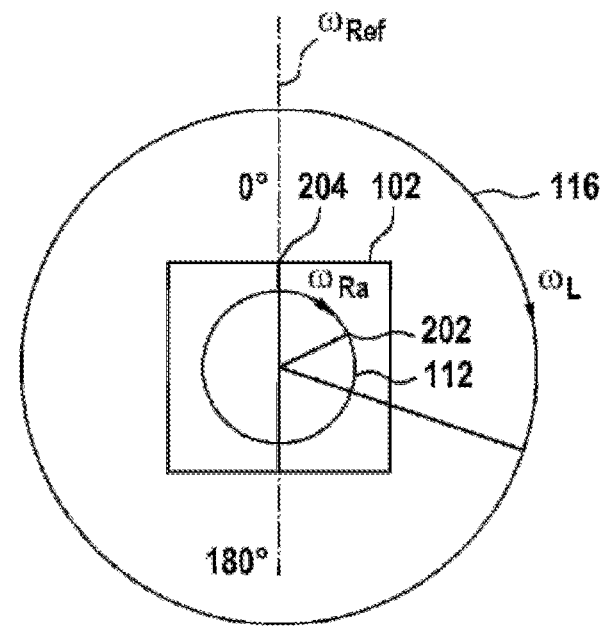
FIG. 2 shows angular positions schematically.

FIG. 2 shows schematically angular positions that can occur during movements in the steering system 100.

The steering controller 104 is designed to determine a compensation value for compensation of the dynamic behavior of an axle 106 steered by the steering system 100. The setpoint variable $\tilde{T}_{Mot}$ is determined depending on the compensation value.

In a first example the steering controller 104 is designed to determine the compensation value depending on information about the rack travel $s_{Ra}$.

More precisely, the steering controller 104 is designed to determine a setpoint motor torque $T_{Mot}$, wherein a compensated setpoint motor torque is determined as the setpoint variable $\tilde{T}_{Mot}$ depending on the compensation value and the setpoint motor torque $T_{Mot}$.

The front axle dynamics are preferably measured for all vehicles in the road test, for example. In addition, models of the front axle dynamics, which are available, for example, by means of a design tool in an early acquisition phase, can be used.

Thus, in the first example a linear model of the front axle dynamics is generated.

The input variable of the linear model of the front axle dynamics that is used is the rack travel $s_{Ra}$, which can be determined from sensor data that is already available in conventional steering systems, for example, the rotor position 202, the torque $T_{Tb}$ on the torsion bar 114 or other electronic power steering sensor data, by sensor fusion, for example, by means of a Kalman filter. As the output, for example, the rack force $F_{Ra}$ is calculated as a disturbance force. The setpoint variable is determined from this to generate a motor torque that counteracts the disturbance force.

In addition to compensating the front axle dynamics, the calculated variable, here referred to as the compensation value, can be used to emulate a certain behavior of the front axle. For example, a use case would be steer-by-wire systems.

For this purpose, for example, the in-vehicle front axle dynamics can be compensated and another axle dynamics can be superimposed.

As an alternative, instead of the measured front axle dynamics, a spring mass damper oscillator can be used and a virtual axle can be parameterized depending on the tires and the axle design. This is useful when there is no axle for parameterizing the control system.

In a second example, simplifications of the model are made. As a result, determining the rack travel $s_{Ra}$ can be dispensed with.

In addition to already applied controller methodology and parameterization for the steering assistance, a component is added that works against the front axle dynamics and compensates the influence thereof.

Such a steering system 100 with front axle dynamics as a disturbance can be represented as follows:

$$\begin{bmatrix} T_{Tb} \\ s_{Ra} \end{bmatrix} = G \begin{bmatrix} T_{Mot} \\ F_{Ra} \end{bmatrix} = \begin{bmatrix} K & L \\ M & N \end{bmatrix} \begin{bmatrix} T_{Mot} \\ F_{Ra} \end{bmatrix}$$

$$F_{Ra} = R s_{Ra}$$

with
 G Transmission behavior of the steering system 100,
 K Transmission behavior K from the setpoint motor torque $T_{Mot}$ to the torque $T_{Tb}$ on the torsion bar 114,
 L Transmission behavior from the motor torque $T_{Mot}$ of the electric drive of the steering assistance to the torque $T_{Tb}$ on the torsion bar,
 M Transmission behavior from the motor torque $T_{Mot}$ to the rack travel $s_{Ra}$,
 N Transmission behavior from the rack force $F_{Ra}$ to the rack travel $s_{Ra}$,
 R Transmission behavior from the rack travel $s_{Ra}$ to the rack force $F_{Ra}$.

R represents the disturbance caused by the front axle dynamics. By using the simplification $s_{Ra}=cT_{Tb}$ with $c \in \mathbb{R}$ and assuming a linear torsion bar stiffness and a constant transmission ratio of a steering gear in the steering system, this MIMO system can be transferred to a SISO system and can be represented as follows:

$$T_{Tb} = \frac{K}{1 - c\,L\,R} T_{Mot} = K\,G\,T_{Mot}$$

In order to eliminate the influence of the front axle dynamics, the pilot control is determined as:

$$\tilde{G} = 1 - cLR.$$

Figure 3:
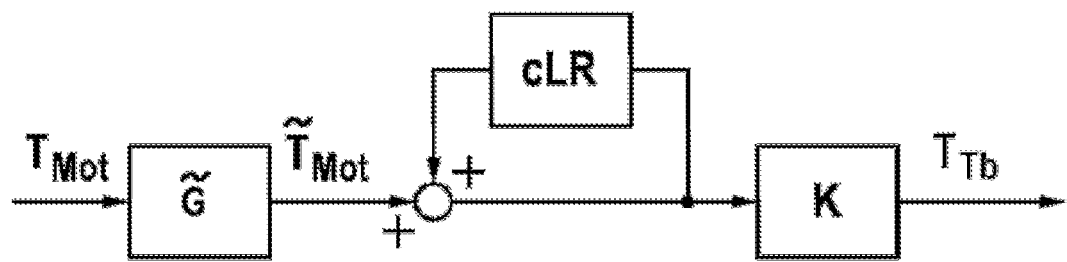
FIG. 3 shows parts of a control loop schematically.

The control circuit, which is partially represented in FIG. 3, contains a conventional control for determining a setpoint assistance torque as the setpoint motor torque $T_{Mot}$. This is first changed to the setpoint variable $\tilde{T}_{Mot}$ by multiplying with the compensation value $\tilde{G}$. In FIG. 3, the transmission behavior K from the setpoint motor torque $T_{Mot}$ to the torque $T_{Tb}$ on the torsion bar 114 is also shown. In addition, further transmission behavior of the steering system in FIG. 3 is taken into account by additive feedback of the terms
 cLR
to the setpoint variable $\tilde{T}_{Mot}$.

The steering controller 104 is designed in this example to determine the compensation value $\tilde{G}$ as $$\tilde{G} = 1 - cLR.$$

Preferably, functions L and R are used, wherein the zero or pole positions of the transmission function are not reduced by their multiplication. It will not be assumed that the front axle dynamics are completely compensated. Model deviations due to different rim sizes and loading levels can be compensated as before by the steering controller. Since these front axle dynamics have a similar profile, an improvement of the control behavior is made possible even with different tires and ground.

The invention claimed is:

1. A method for controlling a steering system having electric steering assistance, the method comprising:
 specifying, with a steering controller, a setpoint variable for the electric steering assistance;
 controlling the steering system depending on the setpoint variable;
 determining a compensation value configured to compensate for a dynamic behavior of an axle steered by the steering system based on a model; and
 determining the setpoint variable depending on the compensation value,
 wherein the compensation value is determined according to the equation:

$$\tilde{G} = 1 - cLR,$$

where $\tilde{G}$ is the compensation value, $c \in \mathbb{R}$, L is a transmission behavior from a motor torque of an electric drive of the electric steering assistance to the torque on a torsion bar that connects a steering wheel of the steering system to the electric drive, and R is a transmission behavior from a rack travel to a rack force that acts on a rack of the steering system.

2. The method as claimed in claim 1, wherein the compensation value characterizes the rack force that acts on the rack of the steering system.

3. The method as claimed in claim 2, further comprising:
 determining the compensation value depending on information about the rack travel that indicates a deflection of the rack relative to a reference position of the rack.

4. The method as claimed in claim 3, further comprising:
determining the information about the rack travel depending on at least one measured value, wherein at least one of:
  the at least one measured value characterizes information about a rotor position of an electric drive of the electric steering assistance relative to a reference position;
  the at least one measured value characterizes information about a torque on the torsion bar, the torsion bar; and
  the at least one measured value characterizes one of (i) information about an angular position of a steering wheel and (ii) information about an angular position of a shaft driving the rack relative to a reference angle position.

5. The method as claimed in claim 1, further comprising:
determining a setpoint motor torque; and
determining a compensated setpoint motor torque as the setpoint variable depending on the compensation value and the setpoint motor torque.

6. A steering system comprising:
an electric steering assistance; and
a steering controller configured to (i) specify a setpoint variable for the electric steering assistance, (ii) control the steering system depending on the setpoint variable, (iii) determine a compensation value configured to compensate for a dynamic behavior of an axle steered by the steering system based on a model, and (iv) determine the setpoint variable depending on the compensation value,
wherein the compensation value is determined according to the equation:

$$\tilde{G} = 1 - cLR,$$

where $\tilde{G}$ is the compensation value, $c \in \mathbb{R}$, $L$ is a transmission behavior from a motor torque of an electric drive of the electric steering assistance to the torque on a torsion bar that connects a steering wheel of the steering system to the electric drive, and $R$ is a transmission behavior from a rack travel to a rack force that acts on a rack of the steering system.

7. The steering system as claimed in claim 6 further comprising:
the rack,
the compensation value characterizes the rack force that acts on the rack.

8. The steering system as claimed in claim 7, the steering controller being further configured to:
determine the compensation value depending on the information about the rack travel that indicates a deflection of the rack relative to a reference position of the rack.

9. The steering system as claimed in claim 8, the steering controller being further configured to:
determine the information about the rack travel depending on at least one measured value, wherein the steering system comprises at least one of:
  an angular position encoder configured detect the at least one measured value as information about a rotor position of an electric drive of the electric steering assistance relative to a reference position;
  a torque encoder configured to detect the at least one measured value as information about a torque on the torsion bar; and
  an angular position encoder configured to detect the at least one measured value as one of (i) information about an angular position of the steering wheel relative to a reference angle position and (ii) information about an angular position of a shaft driving the rack relative to a reference angle position.

10. The steering system as claimed in claim 6, the steering controller being further configured to:
determine a setpoint motor torque; and
determine a compensated setpoint motor torque as the setpoint variable depending on the compensation value and the setpoint motor torque.

11. A method for emulation of dynamics of an axle of a motor vehicle steered by a steering system, the steering system having a rack, the method comprising:
determining a compensation value configured to compensate for a dynamic behavior of the axle based on a model, the compensation value being determined depending on information about a rack travel that indicates a deflection of the rack relative to a reference position of the rack,
determining the information about the rack travel depending on at least one measured value, the at least one measured value characterizing at least one of (i) information about a rotor position of an electric drive of an electric steering assistance of the steering system relative to a reference position (ii) information about an angular position of a steering wheel and (iii) information about an angular position of a shaft driving the rack relative to a reference angle position,
wherein the compensation value is determined according to the equation:

$$\tilde{G} = 1 - cLR,$$

where $\tilde{G}$ is the compensation value, $c \in \mathbb{R}$, $L$ is a transmission behavior from a motor torque of an electric drive of the electric steering assistance to the torque on a torsion bar that connects a steering wheel of the steering system to the electric drive, and $R$ is a transmission behavior from a rack travel to a rack force that acts on a rack of the steering system.

12. The method as claimed in claim 11, wherein the method is performed on a device.

* * * * *

UNITED STATES PATENT AND TRADEMARK OFFICE
CERTIFICATE OF CORRECTION

| | |
|---|---|
| PATENT NO. | : 11,459,023 B2 |
| APPLICATION NO. | : 16/640984 |
| DATED | : October 4, 2022 |
| INVENTOR(S) | : Milbaier |

It is certified that error appears in the above-identified patent and that said Letters Patent is hereby corrected as shown below:

In the Claims

In Claim 4, at Column 7, Lines 10-11: "a torque on the torsion bar, the torsion bar; and" should read --a torque on the torsion bar; and--.

Signed and Sealed this
Ninth Day of May, 2023

Katherine Kelly Vidal
*Director of the United States Patent and Trademark Office*